US006956213B2

United States Patent
Antesberger

(10) Patent No.: US 6,956,213 B2
(45) Date of Patent: Oct. 18, 2005

(54) ALTERNATIVE PIXEL SHAPES FOR UNCOOLED MICROBOLOMETERS

(75) Inventor: A. Wayne Antesberger, Woodbridge, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 281 days.

(21) Appl. No.: 10/443,086

(22) Filed: May 22, 2003

(65) Prior Publication Data

US 2004/0232336 A1 Nov. 25, 2004

(51) Int. Cl.[7] ................................................. G01J 5/00
(52) U.S. Cl. ..................................... 250/338.1; 250/332
(58) Field of Search .............................. 250/338.1, 332

(56) References Cited

U.S. PATENT DOCUMENTS 6,121,603 A * 9/2000 Hang et al. ................. 250/216
6,841,768 B2 * 1/2005 Moon et al. ............. 250/208.1
2004/0200961 A1 * 10/2004 Parrish et al. ........... 250/338.1

* cited by examiner

Primary Examiner—David Porta
Assistant Examiner—Christine Sung
(74) Attorney, Agent, or Firm—Arthur K. Samora; Wiliam H. Anderson

(57) ABSTRACT

An infrared (IR) imaging system in accordance with the present invention includes a substrate, a plurality of disc-shaped microbolometer pixels that combined to define a Focal Plane Array. Each pixel is electrically connected to the substrate with a pair of opposing helical isolation legs. One end of the isolation leg is attached to the pixels periphery while the other is fixed to that substrate so that the FPA and a plane containing the substrate have a parallel, spaced-apart relationship. In this manner, the isolation leg(s) provides an electrical communication path from each pixel to the substrate as each pixel undergoes an internal change in resistance due to absorption of IR energy. At the same time, the legs separate the pixels from the substrate so that there is no heat transfer between the pixel and the substrate due to direct contact. The disc shape arrangement allows for a staggered arrangement of adjacent rows in the array, thereby increasing the fill factor for the FPA of the device.

12 Claims, 5 Drawing Sheets

ALTERNATIVE PIXEL SHAPES FOR UNCOOLED MICROBOLOMETERS

FIELD OF THE INVENTION

The present invention applies generally to imaging devices. More specifically, the present invention applies to infrared (IR) imaging devices. The present invention is particularly, but not exclusively, useful as an uncooled IR imaging device with improved pixel structure, which allows for an increased field of view, increased resolution of IR images by way of increased fill factor of the Focal Plane Array, and increased sensitivity by way of increased absorption and absorption area for the device.

BACKGROUND OF THE INVENTION

Prior art infrared (IR) imaging systems typically include a planar detector area, which is also known as the Focal Plane Array (FPA), which is planar detector pixels on a planar substrate that typically includes a Read Out Integrated Circuit (ROIC). The planar detector area further usually consists of a plurality of pixels that are mostly thermally isolated from, but electrically connected to, the substrate via mechanical isolation legs. The pixels act as microbolometers, in that IR energy from the scene changes the pixel temperature, which further changes the pixel resistance. For each pixel, the change in resistance across the isolation legs is detected, measured, and represented by support circuitry, both in the substrate and other support circuit boards, to generate an IR image.

For most IR imaging systems, there are several characteristics that are extremely desirable. Specifically, it is desired that the systems have the best sensitivity achievable. It is also desirable that the IR images generated have a high resolution for any given Field of View (FOV). It is also generally desirable that IR imaging systems have a larger FOV if task-required resolution can be retained. The shape of the pixels, as well as the arrangement thereof within the FPA, can affect these attributes, in that an FOV increase requires an increase in the number of pixels in the FPA and how closely they are located to each other if resolution and performance are to be retained.

The FPA unit cell Fill Factor is the ratio of active absorption area to unit pixel cell size. Unit cell Fill Factor can influence how the detector pixels are arranged on the FPA and the number of pixels per unit area. Different pixel shapes and different pixel arrangements could increase the unit cell Fill Factor and also fill some of the non-imaging real estate of the FPA with active absorption area. Such arrangements which improve the Fill Factors of the unit cell and the FPA could provide increased resolution for the imaging device, and could improve IR imaging performance in microbolometer based systems using single or multiple layer pixel designs.

For prior art IR devices, the microbolometer pixels usually have a rectangular planar absorption area and are arranged in straight, perpendicular rows and columns. Further, the isolation legs typically extend outwardly from the pixel perimeter for a single layer structure, or are folded under the absorption area in right angle traces for a multiple layer structure. The rectangular shape of the current pixel and isolation leg structure would not greatly benefit from a staggered pixel arrangement in terms of FPA fill percentage. Although a staggered row or column design may help IR imaging system performance with rectangular pixels in terms of image sampling, it would be of further benefit to change the shape of the pixel and allow them to be placed more closely together on the FPA.

In some instances, it is desirable to have an increased Field Of View (FOV) for the IR imaging system, which could result in increased angles of incidence for the incoming IR radiation energy from the scene depending on the system front end optics. Absorption, and therefore sensitivity, could be improved if the incoming radiation is as orthogonal as possible to the pixel surface.

Superimposed over these considerations is the fact that microbolometer pixels are coincident with spaced-apart parallel planes, which establishes a tuned resonant cavity for the wavelength of interest between the FPA and the substrate for the device. During operation, a portion of the incoming IR radiation passes through the pixel absorption surface and reflects off of the substrate to be absorbed again by the pixel. If pixel shapes are changed, then the resonant cavity efficiency of operation could be changed accordingly and perhaps adversely.

One way to increase pixel absorption, especially at increased angles of incident radiation, would be to curve the absorption surface area of each microbolometer pixel in one or both directions. A method of decreasing the distance between pixels on the FPA would be to maximize the unit cell fill factor and pursue alternative shapes to the current rectangles.

In light of the above, it is an object of the present invention to provide an IR imaging device with pixels having round absorption areas, to allow for different pixel arrangement on the substrate to create more densely packed FPAs. It is another object of the present invention to provide an IR imaging device with a higher fill factor per unit area. Another object of the present invention is to provide an IR device with a curved absorption surface to improve the absorption of the device. Yet another object of the present invention is to provide an IR imaging device capable of maintaining sensitivity with an increased Field Of View. Another object of the present invention is to provide an IR imaging device that is relatively easy to manufacture in a cost-effective manner.

SUMMARY OF THE INVENTION

An infrared (IR) imaging system in accordance with the present invention includes a substrate, a plurality of microbolometer pixels and a plurality of isolation legs. A pair of isolation leg interconnects each pixel with the substrate. To do this, one end of the isolation leg is physically and electrically connected to the periphery of the pixel, while the other end is physically and electrically connected to the substrate. In this manner, the isolation leg(s) provides an electrical communication path from each pixel to the substrate as each pixel undergoes an internal change in resistance due to absorption of IR energy. At the same time, the legs separate the pixels from the substrate so that there is minimal heat transfer between, and influence of, the pixel and the substrate due to direct contact.

The periphery of each pixel is also rounded; the isolation legs extend concentrically around the pixel immediately proximate the periphery for a single layer structure, or concentrically under the pixel in the case of a multiple layer structure. With a round configuration, the pixels can be placed more closely together when the plurality of pixels is placed in a FPA. The rounded periphery of the pixels further allows for staggering of the pixels in adjacent rows. The rounded periphery of the pixels, as well as the arrangement of the pixels, allows for an FPA with an increased number of pixels per unit area. Preferably, the pixel periphery is circular, although elliptical peripheries may be appropriate in FPA's for wide-angle IR imaging devices.

In an alternative embodiment of the present invention, the FPA of pixels is parallel to, yet spaced-apart from, a plane defined by the substrate. For this embodiment, the pixel is a multiple layer structure where the isolation legs preferably have a helical shape and extend from a first end attached to the pixel periphery to a second end attached to the substrate. This embodiment further allows for a concave absorption area, with the convex bottom of the pixel to extend partially downward into a resonant cavity located between the substrate plane and the pixel structure. With this configuration, any residual IR energy that passes through the absorption area of the pixel is reflected and constructively interferes with itself to increase efficiency. In addition, the curved pixel surface would allow high incident angle scene radiation to be more readily absorbed, thereby increasing efficiency.

BRIEF DESCRIPTION OF THE DRAWINGS

The novel features of this invention will be best understood from the accompanying drawings, taken in conjunction with the accompanying description, in which similar characters refer to similar parts, and in which.

WRITTEN DESCRIPTION OF THE PREFERRED EMBODIMENT

Figure 1:
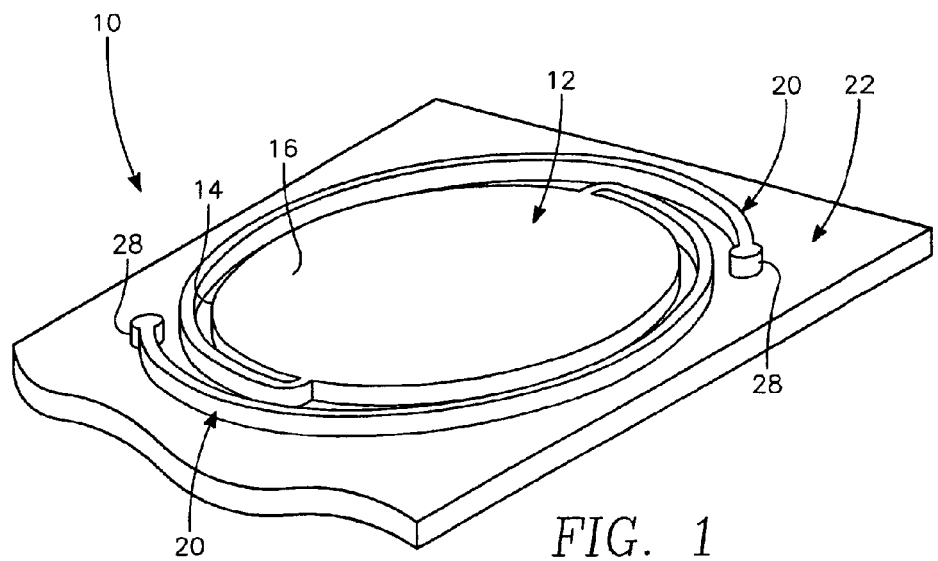
FIG. 1 is a greatly enlarged isometric view of a single pixel and a portion of the substrate for the imaging device of the present invention.

Referring now to the Figures, an infrared (IR) imaging device of the present invention is shown and is generally designated by character reference 10. As shown, the device includes a microbolometer pixel 12, which is somewhat disc-shaped, with a rounded periphery 14, a planar absorption surface 16 and a cavity surface 18. The pixel shown in FIGS. 1–7 has a circular periphery. It is to be understood, however, that other rounded geometrical periphery shapes, such as ellipses and parallelograms, are also envisioned without departing from the scope of the present invention.

Figure 2:
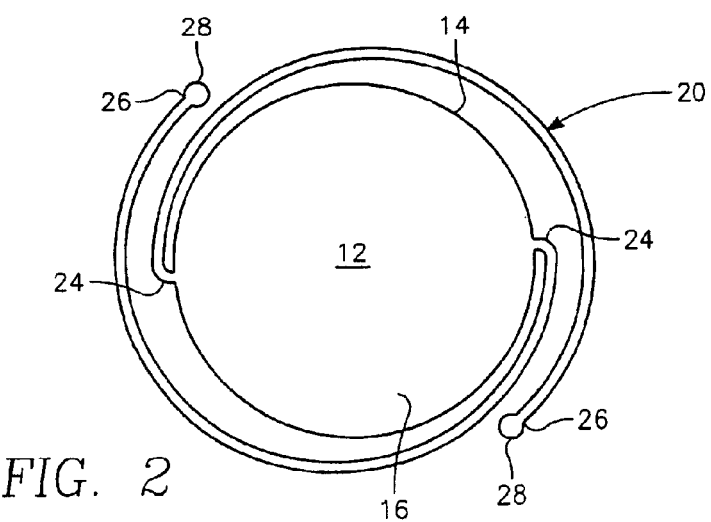
FIG. 2 is a top plan view of the pixel of FIG. 1.

A pair of isolation legs 20, 20 interconnect each pixel 12 with a substrate 22. To do this, a periphery end 24 of each isolation leg is connected to periphery 14 of pixel 12, while the opposing substrate end 26 is fixed to substrate 10. As shown in FIGS. 1 and 2, each isolation leg extends concentrically around the pixel periphery. Preferably, the isolation legs extend around the pixel immediately proximate its periphery, to minimize the surface area used by the pixels. With this configuration, when a plurality of the pixels are arranged in a grid as a Focal Plane Array (FPA), the number of pixels per unit area of substrate, or FPA fill factor, can be increased.

The isolation legs function to somewhat thermally isolate the microbolometer pixel from the substrate, while at the same time providing an electrical path from the microbolometer pixel to the substrate when the pixel undergoes a change in resistance in response to detection of infrared (IR) energy. Stated differently, for each pixel, the pair of isolation legs establishes an electrical microcircuit between the pixel and the substrate.

Figure 3:
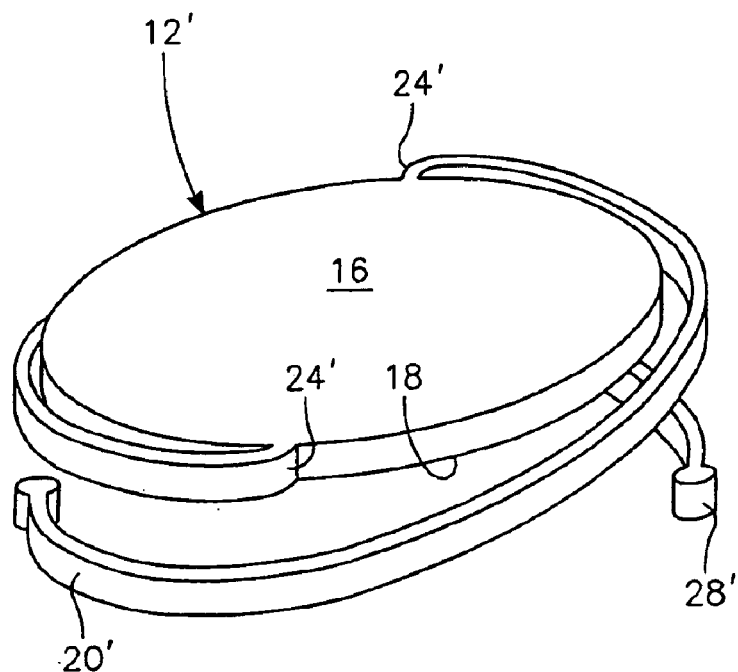
FIG. 3 is an isometric view of an alternative embodiment of the pixel of FIG. 2.
Figure 4:
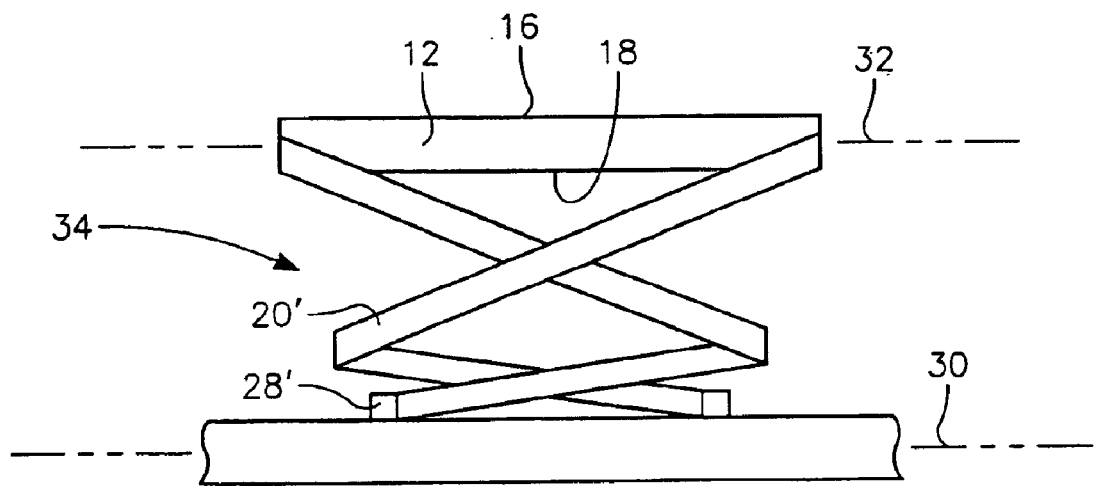
FIG. 4 is a side elevational view of the pixel of FIG. 3 along with a portion of the substrate.

Referring now primarily to FIGS. 3–4, an alternative pixel embodiment for the present invention is illustrated. As shown, the embodiment comprises a multi-layer device in which substrate 22 defines a substrate plane 30 and pixels 10 arranged to define an FPA that lies in the plane depicted by dotted line 32 in FIG. 4. Preferably, substrate plane 30 is parallel to and spaced-apart from the FPA in plane 32, as best seen in FIG. 4. Such an arrangement defines a resonant cavity 34 between the FPA and the substrate, wherein residual IR energy that passed through the pixel often becomes reflected and absorbed during operation of the device.

Figure 6:
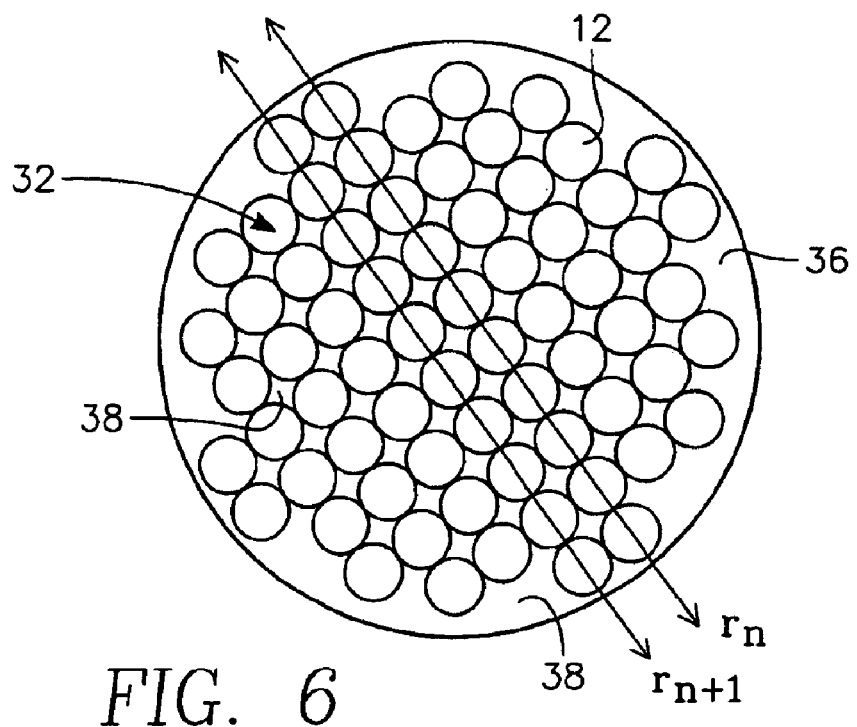
FIG. 6 is a greatly enlarged top plan view of arrangement of pixels of FIG. 2 on a unit area of substrate where the adjacent rows are not staggered.
Figure 7:
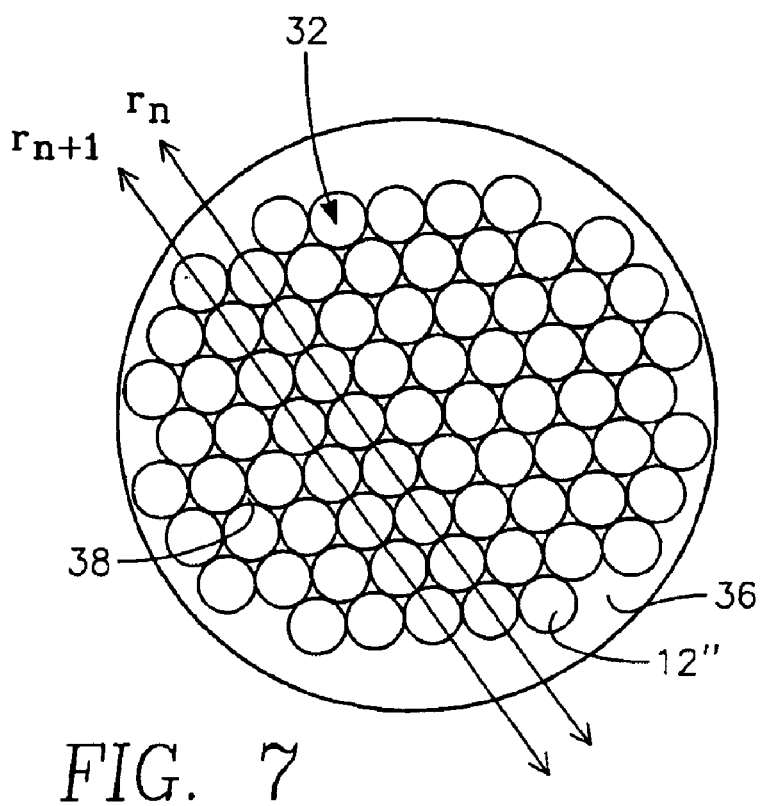
FIG. 7 is the same view of FIG. 6 but with the pixels of adjacent rows staggered.

For this embodiment, the isolation legs 20' are attached to the periphery and extend in a helical manner away from the IR surface towards the substrate, being attached at leads 28'. More specifically, the isolation legs are attached to the periphery 14 and initially extend around the periphery proximate periphery end 24. Proceeding along isolation leg 20' from periphery end 24' towards substrate end 26', however, the isolation leg 20' curves helically under the pixel so that it is directly under the pixel. Because the isolation legs 20' extend primarily under the pixel in this arrangement, and not around the periphery 14 thereof, the overall surface area per pixel is decreased. This further allows for the pixels to be placed immediately adjacent each other in the FPA, as shown in FIGS. 6 and 7 for reasons hereinafter described.

Figure 5:
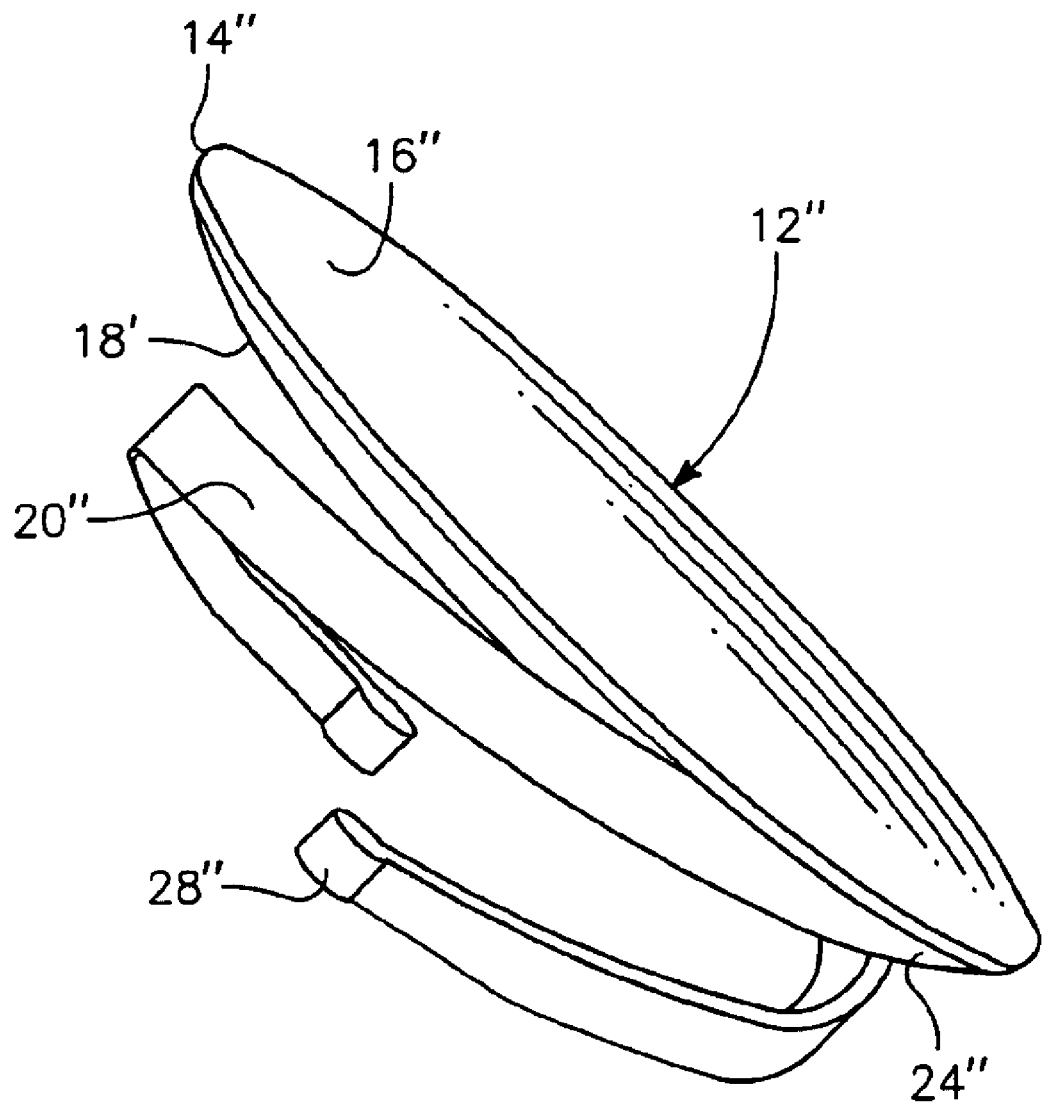
FIG. 5 is an isometric view of a second alternative embodiment of the pixel of FIG. 2.

A second embodiment of the pixel for the present invention is shown in FIG. 5. For the embodiment, the microbolometer pixel 12" as a bowl shape, with a concave absorption surface 16" and cavity surface 18" (when viewed in top plan from the absorption surface side), so that the pixel extends in a hemispherical fashion toward the substrate. With this configuration, any IR energy which passes through microbolometer pixel 12" could be reflected and diffused in the resonant cavity rather than absorbed. As a result, this embodiment maybe slightly less efficient when compared to a currently standard device. It is to be further appreciated that the IR surface could also be convex so that the cavity surface extends away from the substrate if design considerations for the application warrant.

As shown in FIG. 5, isolation legs 20" are attached to the pixel at cavity surface 18" immediate proximate periphery 14" so that they extend helically downward therefrom. With this configuration, the isolation legs 20" are located completely under the pixel and cannot be observed from the absorption surface side of the pixel. This further decreases the surface area of each pixel and allows for the pixels to be placed more closely together within the FPA.

To attach pixel 39 to the substrate, at least one, and preferably a pair of opposing helical legs 44 are attached. More specifically, a pixel end 46 merges into the underside of the pixel 39 proximate the periphery, and the helical end 44 extends helically downward and terminated at a contact tab 48, which is fixed to the substrate.

Preferably, the pixel and isolation legs are an integral structure and are made from a silicon, silicon dioxide, vanadium oxide, or related material with a suitable Thermal Coefficient of Resistance (TCR). The pixel is preferably manufactured with current manufacturing techniques, such as those used for manufacturing Micro Electro Mechanical Systems (MEMS), except that the masking patterns, lithography, and deposition steps would be slightly changed to yield the geometric shapes for the pixels and isolation legs discussed above. Any material used for manufacturing a prior art microbolometer pixel could also be appropriate for the pixel of the present invention.

Figure 8:
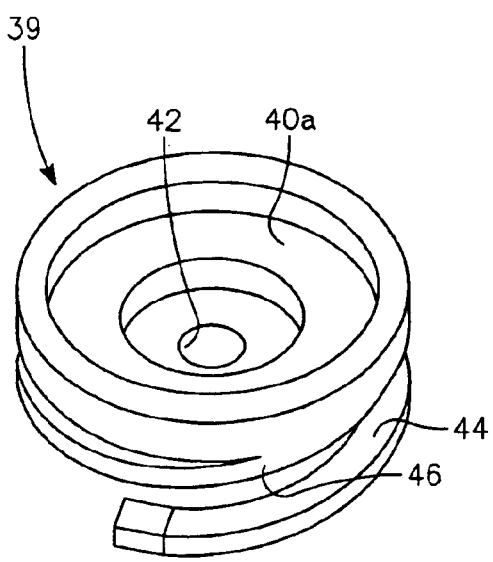
FIG. 8 is an isometric view of a third alternative embodiment of the pixel of FIG. 2.
Figure 9:
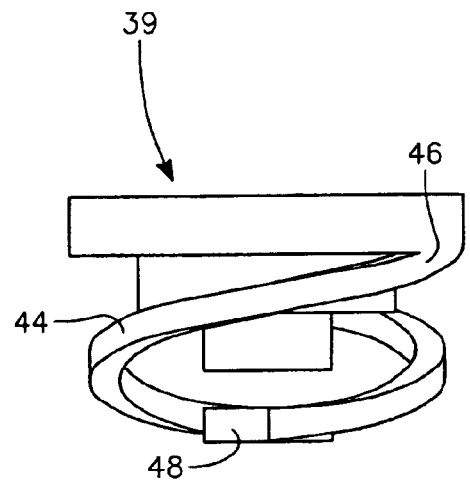
FIG. 9 is a side elevational view of the pixel of FIG. 8.
Figure 10:
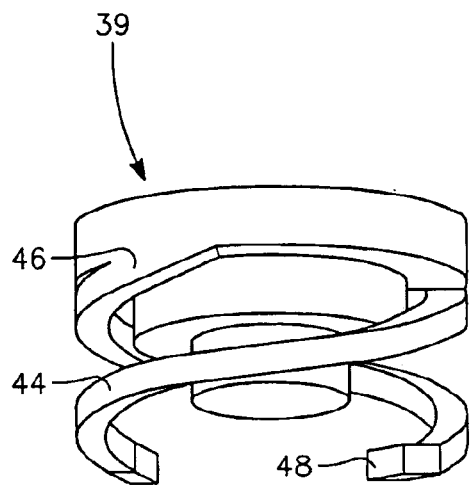
FIG. 10 is an isometric view of the bottom of the pixel of FIG. 8.
Figure 11:
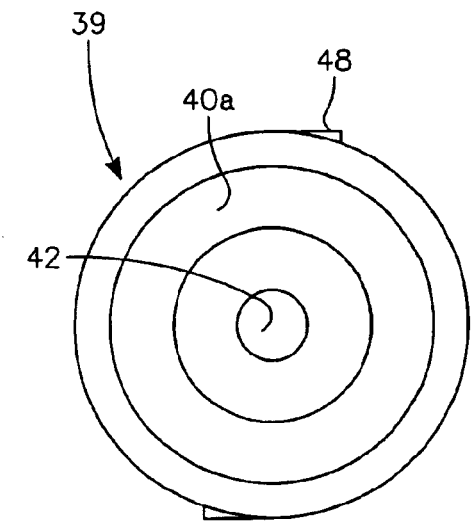
FIG. 11 is a top plan view of the pixel of FIG. 8.

A third embodiment of the pixel for the present invention is shown in FIGS. 8–11. For this embodiment, the microbolometer pixel 39 has a stepped hemispherical bowl shape defined by a plurality of annular absorption surfaces 40, of which surface 40a in FIG. 8 is representative. The annular absorption surfaces 40 are arranged around a center absorption surface 42 so that they concentric when viewed in top plan (See FIG. 11), and so that the annular surfaces 40 are co-incident with respective planes that are parallel and spaced-apart from each other. With this configuration, any IR energy, which passes through microbolometer pixel 39, could be reflected and minimally diffused by the bottom of the pixel and produce constructive interference in the resonant cavity for further absorption.

This stepped, or terraced, hemispherical configuration provides the further advantage of increased efficiency for the pixel. Specifically, the various annular absorption surfaces have different radii an overall area, which allows the pixel could be tuned for different IR wavelengths corresponding to the geometry of the annular absorption surface. Additionally, the number of annular absorption surfaces could be varied from device to device, with increasing numbers of surfaces approaching the bowl shape described above. It is to be further appreciated that the IR surface could also be convex and so that the cavity surface extends away from the substrate if design considerations for the application warrant. Finally, it should also be appreciated that geometrical shapes (when view in top plan) for the third embodiment would also apply, such as elliptical, square, rectangular, or parallelogram.

The performance of the IR imaging device of the present invention can also be described in terms of the unit cell fill factor, and the number of pixels per unit area of substrate. FIGS. 6 and 7 illustrate how the FPA fill factor can be further increased by changing the arrangement of a plurality of pixels in a FPA. Specifically, FIG. 6 shows a plurality of pixels arranged on a circular unit area 36 of substrate. In FIG. 6 (which is also representative of how pixels of prior art devices are arranged), the pixels are arranged in rows, which are in alignment. This creates a plurality of "dead spots" (illustrated by reference character 38) in the FPA that do not receive any IR energy from a scene (not shown).

FIG. 7 shows the desired arrangement of plurality of pixels for the present invention within the FPA. The staggered, or offset, arrangement of pixels in adjacent rows $r_n$ and $r_{n+1}$ allows for pixels to be placed in most of the dead spots so that the size/number of dead spots 38 is minimized. The net result is an increased FPA fill factor, or the number of microbolometer pixels per unit area for the device, which further could provide an increased resolution of the system generated IR image.

In the operation of the present invention, a plurality of pixels is arranged in a FPA so that the pixels 12 in adjacent rows $r_n$ and $r_{n+1}$ are staggered, as shown in FIG. 7. IR energy from a scene is received by the pixels and thereby absorbed. In response, the affected microbolometer pixel(s) changes resistance according to the amount of IR energy absorbed. Since each pixel is actually a microcircuit resistor, the resistance change across the pixel is detected by ROIC, which are placed in the substrate prior to the MEMS process in a manner known in the art. The ROIC converts the change in resistance for each pixel into a proportional voltage for digitization and pixel non-uniformity correction, which is then formatted in a video signal for observation by the user.

While the infrared imaging device of the present invention, as herein shown and disclosed in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. An infrared (IR) imaging device comprising:
   a substrate defining a substrate plane;
   a plurality of microbolometer pixels, each said pixel electrically connected to said substrate, said pixels combining to define a focal plane array parallel to and spaced-apart from, said substrate plane;
   said pixels having an absorption surface with a rounded periphery; and,
   a plurality of helical isolation legs, at least one isolation leg corresponding to each pixel, said isolation legs having a first end connected to said periphery and a second end connected to said substrate.

2. The device of claim 1 wherein said absorption surface is planar.

3. The device of claim 2 wherein said absorption periphery is elliptical.

4. The device of claim 2 wherein said absorption periphery is circular.

5. The device of claim 1 wherein said absorption surface is convex.

6. The device of claim 1 wherein said absorption surface is concave.

7. The device of claim 6 wherein said periphery is elliptical.

8. The device of claim 6 wherein said periphery is circular.

9. The device of claim 1 wherein said pixels in said focal plane array are arranged in a plurality of rows, so that each said pixel in one of said rows is offset from each said pixels in an adjacent said row.

10. A method for obtaining an infrared (IR) image comprising the steps of:
    A) providing a plurality of microbolometer pixels, each pixel having an absorption area with a defined periphery;
    B) electrically connecting each pixel to a substrate; and, wherein said step B) is accomplished with a helical isolation leg, said helical isolation leg having an first end and a second end, said first end connected to said periphery, said second end attached to said substrate so that each said pixel is spaced-apart from said substrate.

11. The method of claim 10 further comprising the step of:
    C) arranging said pixel in a focal plane array having a plurality of pixel rows, said pixels in one of said rows being offset from said pixel in an adjacent said row.

12. An infrared (IR) imaging apparatus comprising:
    a substrate;
    at least one microbolometer disc having a circular periphery; and,
    a pair of helical isolation legs corresponding to each disc, said legs each having a first end connected to said periphery and a second end connected to said substrate to establish a microcircuit for said device.

* * * * *